United States Patent [19]
Tahara

[11] Patent Number: 5,822,006
[45] Date of Patent: Oct. 13, 1998

[54] VIDEO SIGNAL TRANSMISSION METHOD AND APPARATUS EMPLOYING VARIABLE QUANTIZATION

[75] Inventor: Katsumi Tahara, Kanagawa, Japan

[73] Assignee: Sony Corporation, Tokyo, Japan

[21] Appl. No.: 20,993

[22] Filed: Feb. 22, 1993

[30] Foreign Application Priority Data

Feb. 24, 1992 [JP] Japan ................................. 4-072922

[51] Int. Cl.⁶ .................................................. H04N 7/18
[52] U.S. Cl. ...................... 348/412; 348/405; 348/413; 348/404; 348/408; 348/403
[58] Field of Search .................... 348/405, 404, 348/400, 401, 402, 403, 407, 409, 415, 412, 408

[56] References Cited

U.S. PATENT DOCUMENTS

| | | | |
|---|---|---|---|
| 5,005,077 | 4/1991 | Samad et al. | 348/408 |
| 5,028,999 | 7/1991 | Vogel | 348/405 |
| 5,046,071 | 9/1991 | Tanoi | 348/405 |
| 5,144,426 | 9/1992 | Tanaka et al. | 348/412 |
| 5,291,282 | 3/1994 | Nakagawa | 348/407 |

FOREIGN PATENT DOCUMENTS

| | | |
|---|---|---|
| 0 420 627 | 4/1991 | European Pat. Off. . |
| 0 434 427 | 6/1991 | European Pat. Off. . |
| 0 444 839 | 9/1991 | European Pat. Off. . |
| 0 456 433 | 11/1991 | European Pat. Off. . |

OTHER PUBLICATIONS

CCITT Recommandetion H.261 1990, Geneva 'Video codec for audiovisual services at P ×65 kbit/s'.

Comp. Con 91 Digest of Papers 1991, San Francisco pp. 394–395 XP294007 D. Le Gall The MPEG video compression standard.

*Primary Examiner*—Tommy P. Chin
*Assistant Examiner*—Anand S. Rao
*Attorney, Agent, or Firm*—Frommer Lawrence & Haug LLP; William S. Frommer

[57] ABSTRACT

A video signal transmission method and apparatus for instantaneously providing a normally reproduced picture upon start of an image data transmission or in other potentially unstable states through steady processing, wherein the image signal of one frame is first divided into a plurality of blocks. The image signal of the divided blocks is coded by intraframe coding and interframe coding. The intraframe-coded signal for one frame is transmitted periodically. Meanwhile, the magnitude of the correlation between two blocks is detected, one of the two blocks belonging to a given frame and corresponding to the other block belonging to the preceding frame. Then the quantization characteristic of the image signal to be transmitted is controlled in accordance with the detected magnitude of the correlation.

16 Claims, 6 Drawing Sheets

$$DP = \sum_{i=0}^{15} \sum_{j=0}^{15} (A(i,j) - B(i,j))^2 \quad \cdots \cdots (1)$$

$$DP = \sum_{i=0}^{15} \sum_{j=0}^{15} |A(i,j) - B(i,j)| \quad \cdots \cdots (2)$$

VIDEO SIGNAL TRANSMISSION METHOD AND APPARATUS EMPLOYING VARIABLE QUANTIZATION

BACKGROUND OF THE INVENTION

1. Field of the Invention

The present invention relates to a method for coding and transmitting video signals.

2. Description of the Prior Art

In video signal transmitting applications such as a video telephone system, video signals to be transmitted are very large in quantity. To avoid data overflow, there have been proposed a number of circuits and methods that compress the video signals by predictive coding before they are transmitted.

Predictive coding comes in two types: intraframe coding and interframe coding. Both coding methods process data in units of blocks each made of 16 pixels (horizontal) by 16 pixels (vertical). The intraframe coding method involves compressing video signal data by utilizing the auto-correlation between pixel data within the same frame before the compressed image data are transmitted. The interframe coding method finds the difference between the image data of a given frame and those of the next frame and compresses the difference data for transmission.

Clearly, the image data involved are smaller in quantity under the interframe coding method than under the intraframe coding method. For predictive coding, the image data are thus first processed by the intraframe coding method as initial data and transmitted over the transmission line, followed by the interframe-coded image data that are subsequently transmitted.

Figure 5:
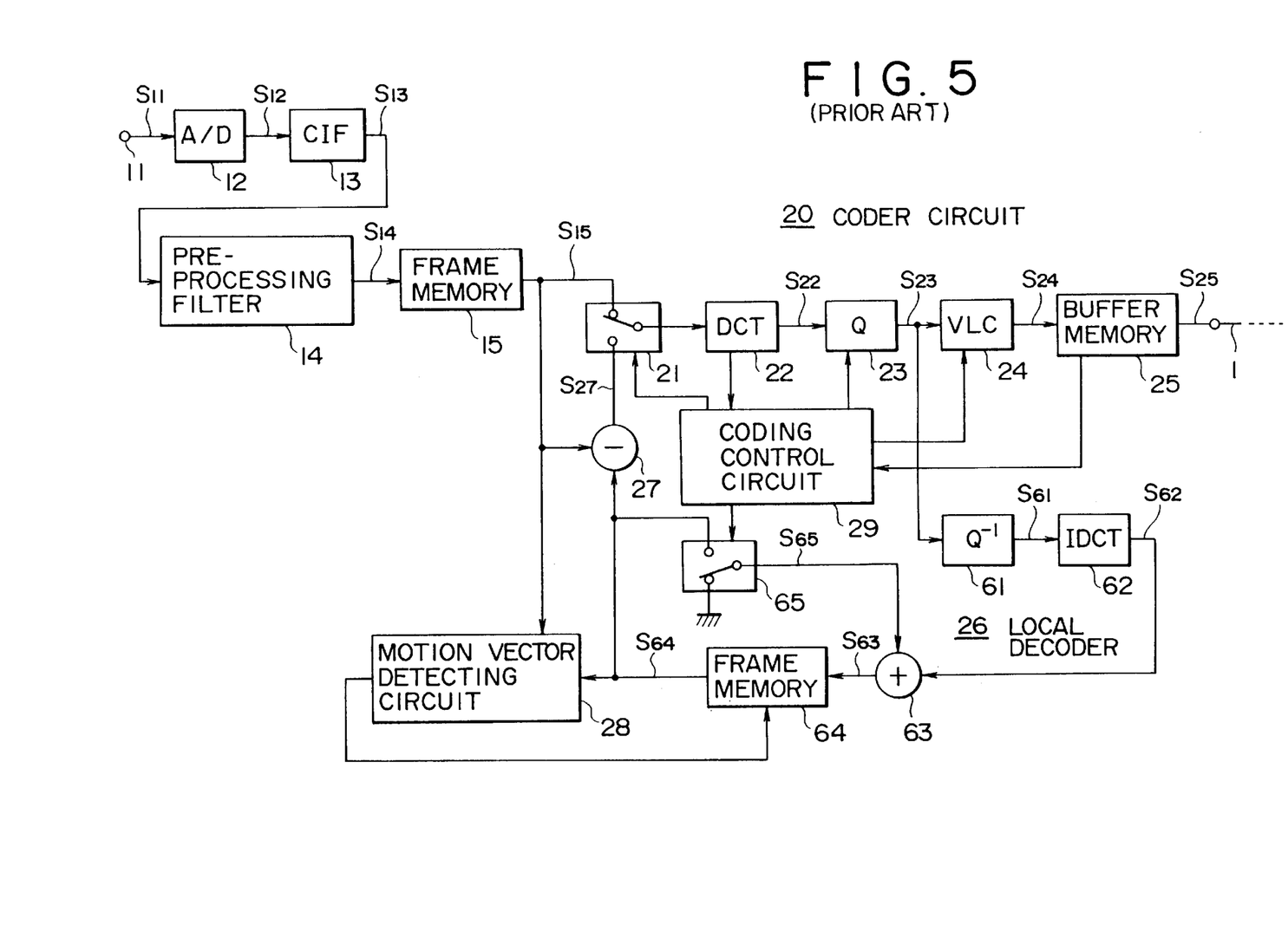
FIG. 5 is a schematic flow diagram of a typical prior art coder circuit.

FIG. 5 is a schematic flow diagram of a typical prior art coder circuit. This example is pursuant to Recommendation H.261 standardized by CCITT. In the circuit of FIG. 5, an analog video signal S11 to be transmitted is first supplied to an A/D converter 12 through a terminal 11. The A/D converter 12 converts the signal S11 to a digital video signal S12. The signal S12 is fed to a CIF conversion circuit 13 for conversion to a CIF video signal S13. The signal S13 is sent to a pre-processing filter 14 for band limiting operation. The pre-processing filter 14 turns the signal S13 into a video signal S14 which is written to a frame memory 15.

A circuit arrangement 20 downstream of the frame memory 15 constitutes an H.261-compatible coder circuit. For intraframe coding, switching circuits 21 and 65 are set as shown. In this setup, the signal S14 is read from the frame memory 15 as a signal S15 (=S14). The signal S15 thus retrieved is supplied through the switching circuit 21 to a DCT (discrete cosine transform) circuit 22. The DCT circuit 22 transforms the signal S15 to a DCT signal S22. The DCT signal S22 is fed to a quantization circuit 23 for re-quantization into a signal S23 with fewer bits than before. The signal S23 is sent to a VLC (variable length coding) circuit 24 for conversion to a VLC signal S24. The signal S24 is output onto a transmission line 1 at a predetermined data rate through a buffer memory 25. At this point, various parameters and data needed to decode the original video signal S11 from the signal S24 are supplied to the VLC circuit from a coding control circuit 29, to be described later. These parameters and data are transmitted together with the signal S24 over the transmission line 1.

In a local decoder 26, the signal S23 from the quantization circuit 23 is supplied to a quantization circuit 61 whose processing is complementary to that of the quantization circuit 23. The quantization circuit 62 turns the signal S23 into a signal S61 that is sent to an inverse DCT circuit 62 whose processing is again complimentary to that of the DCT circuit 22. Because the circuits 61 and 62 carry out their processing in a way complementary to that of the circuits 23 and 22, the signal S61 is restored from the signal S22, and the signal S62 is restored from the signal S15.

The signal S62 is fed to an adder 63, and a signal S65 from the switching circuit 65 are also sent to the adder 63. In turn, the adder 63 produces an added signal S63 based on the two signals S62 and S65. Because S65=0 in this case, S63=S62. The signal S63 is written to a frame memory 64. With the circuits 22, 23, 61 and 62 taking their time for their respective processing, the signal S63 corresponds to the signal S15 that belongs to the preceding frame. Since S63=S62 in this case, the signal S63 is a video signal restored from the signal S15.

Thus the intraframe-coded video signal S24 is output onto the transmission line 1. The video signal S63 in the frame memory 64 represents the video signal S15 restored from the signal S23 equal to the signal S24.

For interframe coding, the switching circuits 21 and 65 are set to the reverse state of what is shown in FIG. 5. In this setup, the signal S15 is sent from the frame memory 15 to a subtracter 27. The signal S63 in the frame memory 64 is read therefrom as the signal S64 (=S63). The signal S64 is then supplied to the subtracter 27, In turn, the subtracter 27 generates a signal S27 representing the difference between the signals S15 and S64. The signal S27 is fed to the DCT circuit 22 via the switching circuit 21.

The signal S27 thus comes to represent the difference between the video signal S11 of a given frame and the video signal S11 of the preceding frame. The difference signal S27 is subjected to DCT processing and re-quantization. The result is the signal S23 that is converted to the signal S24 before it is output onto the transmission line 1.

At this point, the signal S64 is read from the memory 64 and fed to the adder 63 through the switching circuit 65. The adder 63 is also fed with the signal S62 that was converted from the signal S23 via the quantization circuit 61 and inverse DCT circuit 62. Therefore, the signal S63 destined to the memory 64 is equivalent to the video signal S15 restored from the signal S64 of the preceding frame and from the signal S62.

A motion vector detection circuit 28 is provided to perform motion compensation. Take for example a scene where a ball is moving against a stationary background. In that case, the image data about the ball need to be transmitted only for the first frame. From the second frame on, the data representing the vector of the ball (moving object) need only be transmitted in expressing the ball motion. This is where the motion vector detection circuit 28 comes in. The motion vector detection circuit 28 is supplied with the signal S15 from the memory 15 and with the signal S64 from, the memory 64. In turn, the circuit 28 detects the moving object as it moves across two contiguous frames, and compensates accordingly the signal S63 from the memory 64.

Using the signal S22 from the DCT circuit 22, a coding control circuit 29 calculates two kinds of signal power: the power of the signal S22 at the time of intraframe coding and the power of the same at the time of interframe coding. The coding control circuit 29 selects either intraframe or interframe coding so that of the two kinds of signal S22, the one with the lower power level is fed to the quantization circuit 23.

In addition, the coding control circuit 29 controls the step size of re-quantization (i.e., quantization characteristic) performed by the quantization circuit 23. The step size is controlled as per the data quantity of the signal S24 left in the buffer memory. The purpose of the control is to prevent data overflow or underflow in the buffer memory 25.

What has been described above is the typical prior art example of predictive coding of video signals, notably intraframe and interface coding. In the coder circuit described, mismatch blocks can occur on the receiving side at the start of an image data transmission or upon a transmission line error. Any such block adversely affects the quality of subsequently reproduced images. This difficulty needs to be bypassed by transmitting intraframe-coded image data from time to time to update the reproduced image (the process is called forced refresh hereunder).

The forced refresh stipulated under CCITT Recommendation H.261 requires transmitting at least one intraframe-coded image data block for every 132 transmitted frames. In the case of the CIF video signal S13, this requirement is equivalent to generating and transmitting three intraframe-coded data blocks per frame. The coding control circuit 29 selects intraframe coding in such a manner that appropriate block assignments will be made and carried out.

Figure 6:
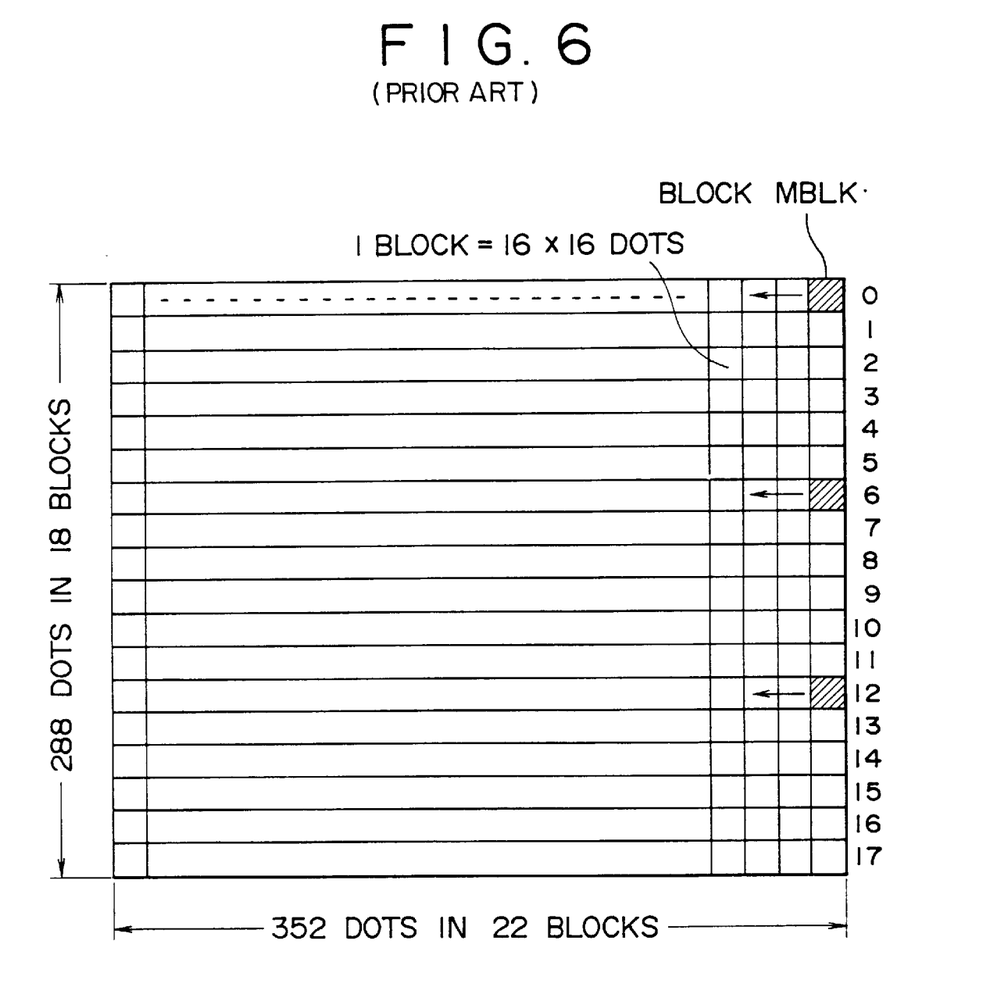
FIG. 6 is a view used to describe how the prior art coder circuit typically works.

FIG. 6 is a view showing how forced refresh takes place conventionally. In this case, the video signal is a CIF signal for which the picture comprises 352 pixels (horizontal) by 288 pixels (vertical). The picture is divided into 22 blocks (horizontal) by 18 blocks (vertical). Each of these blocks is called a macro block MBLK and is made of 16 pixels (horizontal) by 16 pixels (vertical).

Forced refresh starts from the rightmost blocks MBLK—MBLK on lines 0, 6 and 12, and progresses leftward one block per frame as indicated by arrow. When forced refresh reaches the leftmost blocks, it again starts from the rightmost blocks one line below those refreshed and progresses leftward in like manner. Forced refresh thus continues until the entire picture is refreshed.

For the entire picture, forced refresh takes about 4.4 seconds to complete (i.e., 22 blocks×18 blocks/3 blocks= 132 frames). This means that when an image data transmission is started or if an error occurs in the reproduced picture, it takes about 4.4 seconds to obtain a normal image.

Because forced refresh is carried out periodically, the data quantity of the signal S24 in the buffer memory 25 does not fluctuate and the load on the transmission line 1 remains constant.

One disadvantage of the prior art coder circuit described above is that it takes 4.4 seconds to obtain a normal image after the start of an image data transmission or after an error in the reproduced image; it is impossible instantaneously to acquire a normally reproduced image in such cases. Where a plurality of images are switched to transmit one of them, it also takes 4.4 seconds to obtain a normal picture every time one image is replaced with another.

SUMMARY OF THE INVENTION

It is therefore a first object of the invention to provide a video signal transmission method whereby a normally reproduced picture is instantaneously available at the time of, say, the start of an image data transmission.

It is a second object of the invention to provide a video signal transmission method for resolving, without disturbing the reproduced image, the data quantity fluctuation occurring in the buffer memory when the first object is accomplished.

In carrying out the invention and according to one aspect thereof, there is provided a video signal transmission method for transmitting compressed video signals, comprising the steps of: dividing the image signal of one frame into a plurality of blocks; coding the image signal of the divided blocks by intraframe coding and interframe coding; transmitting periodically the intraframe-coded signal for one frame; finding the magnitude of the correlation between two blocks, one of the two blocks belonging to a given frame and corresponding to the other block belonging to the preceding frame; and controlling, in accordance with the magnitude of the correlation, the quantization characteristic of the image signal to be transmitted.

In operation, the image signal of each frame is transmitted periodically by intraframe coding. Then the magnitude of the correlation between two blocks is obtained. One of the two blocks belongs to a given frame and corresponds to the other block that belongs to the preceding frame. The quantization characteristic of the image signal to be transmitted is controlled in accordance with the magnitude of the correlation thus obtained. In this manner, a normally reproduced picture is instantaneously available at the start of an image data transmission or upon a transmission line error. Furthermore, requantization is carried out steadily even when the image data quantity left in the buffer memory fluctuates.

These and other objects, features and advantages of the invention will become more apparent upon a reading of the following description and appended drawings.

DESCRIPTION OF THE PREFERRED EMBODIMENT

Figure 1:
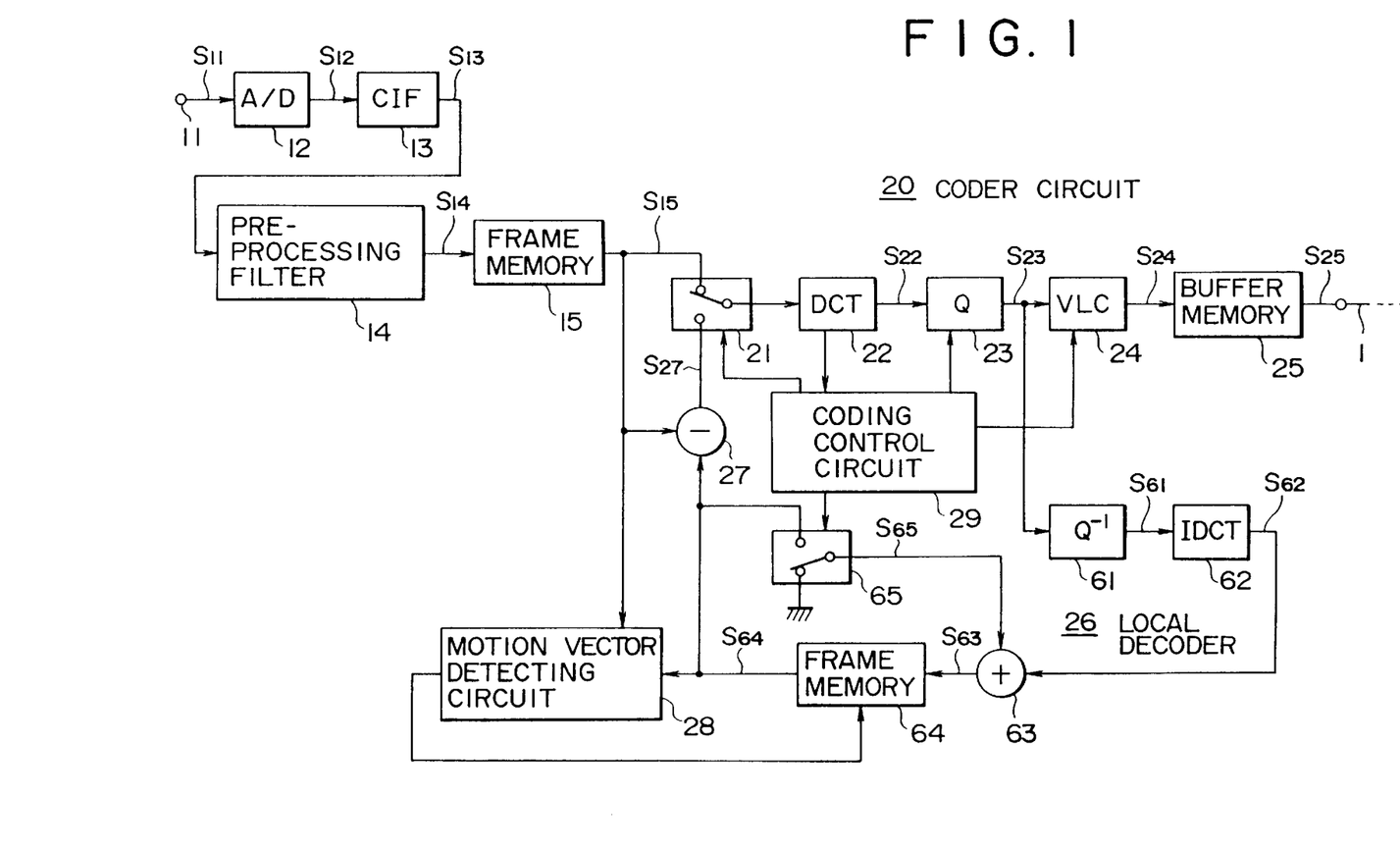
FIG. 1 is a schematic flow diagram of a preferred embodiment of the invention.

The preferred embodiment of the invention will now be described with reference to the accompanying drawings. As shown in FIGS. 1, the hardware constitution of the embodiment is the same as that of the prior art coder circuit in FIG. 5. What is different is that the coding control circuit 29 in the embodiment does not detect the data quantity of the signals S24 in the buffer memory 25. That is, re-quantization of the quantization circuit 23 is not controlled in accordance with the data quantity of the signal S24 left in the buffer memory 25.

Figure 2A:
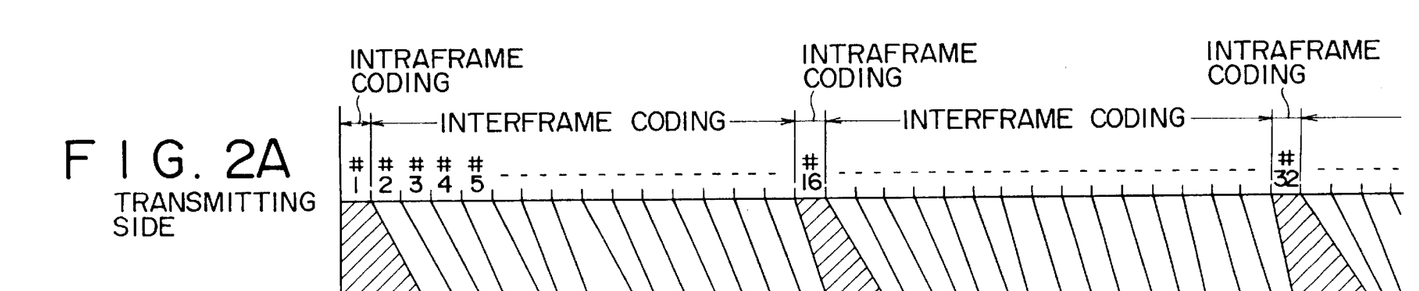
FIG. 2A–2D is a set of views used to describe the embodiment.
Figure 2B:
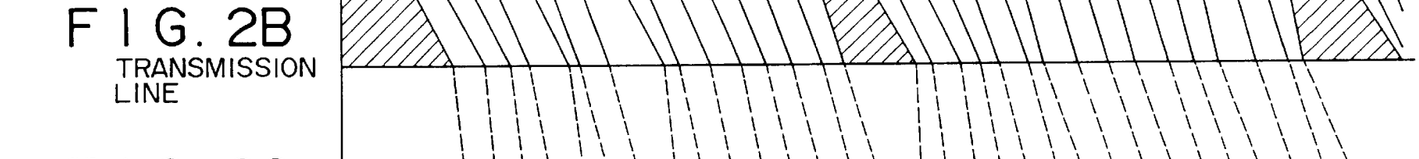
Figures 2C, 2D:
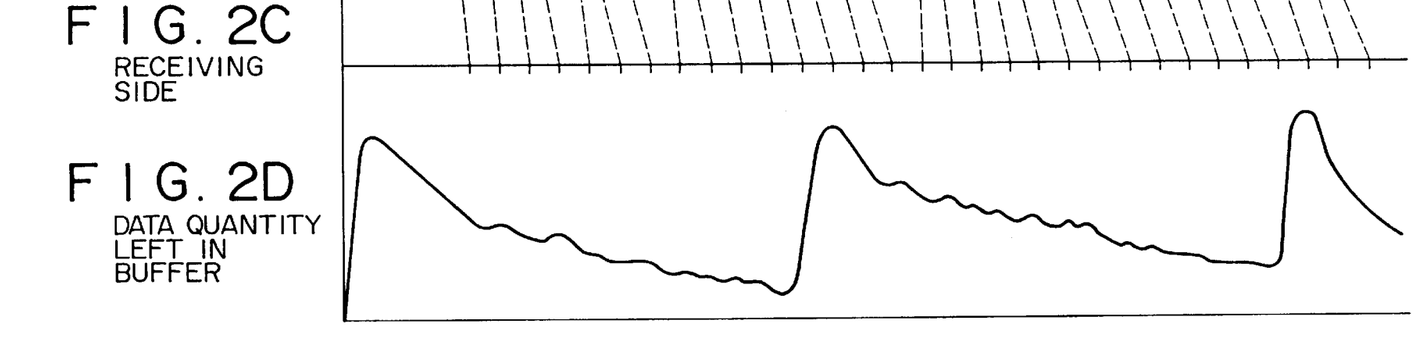

FIG. 2A depicts typical reference time allocations (i.e., flow of time) in units of frame periods on the transmitting side in connection with the embodiment. In FIG. 2A, time t0 is the time at which an image data transmission is started; numbers #1, #2, #3, etc. represent the frame numbers or frame period numbers. FIG. 2B sketches the flow of the signal S24 over the transmission line 1. FIG. 2C illustrates typical reference time allocations, also in units of frame periods on the receiving side in connection with the embodiment.

As shown in FIG. 2A, the transmitting side transmits periodically the intraframe-coded data signal S24 (shown shaded) representing the entire picture. The signal is output onto the transmission line 1 at predetermined intervals of frame periods. In the remaining frame periods, the interframe-coded data signal S24 is output onto the transmission line 1. In this example, the intraframe-coded signal S24 of one frame is first output in frame period #1. In each of the subsequent frame periods #2 through #15, the interframe-coded signal S24 of one frame is output. Thereafter, this signal transmission pattern is repeated. That is, the intraframe-coded signal S24 is output every 16 frames, and the interframe-coded signal S24 is output for the remaining frames.

Where the intraframe-coded signal S24 and the interframe-coded signal S24 are output onto the transmission line 1 as described, the flow of these signals S24 over the transmission line 1 and the flow of frames on the receiving side take place as shown in FIGS. 2B and 2C. Thus when an image data transmission is started, the receiving side can immediately obtain a normally reproduced picture. In case of a transmission line error resulting in a reproduced image error, the receiving side can restore the normal picture instantaneously.

In the above setup with no further attachments, the data quantity of the intraframe-coded signal S24 becomes greater than that of the interframe-coded signal S24. This means that the data quantity of the signal S24 left in the buffer memory 25 fluctuates as shown in FIG. 2D. This can destabilize the re-quantization of the quantization circuit 23.

To avoid the above drawback, the embodiment is arranged to control the quantization circuit 23 as follows. Two contiguous frames with a power level difference therebetween are considered. For a given block MBLK, it is assumed that (i, j) stands for the pixel coordinates in the block (i=0–15, j=0–15); A(i, j) represents the power level of each pixel in the currently referenced block; and B(i, j) denotes the power level of each pixel in the preceding block that corresponds to the currently referenced block. Given the assumption, the difference of power DP between a given block MBLK in a given frame and the block MBLK corresponding to that block in the preceding frame is represented by expression (1) in FIG. 3.

The difference of power DP is related significantly to the correlation between images in the following two aspects:

(1) If the difference of power DP is large, then the change between images is considered to be large and the correlation therebetween to be low (i.e., the difference of power DP is large because the image change is large).

(2) If the difference of power DP is small, then the change between images is considered to be small and the correlation therebetween to be high (i.e., the difference of power DP is small because the image change is small).

The present invention takes advantage of the relationships (1) and (2) above in controlling the step size for the quantization circuit 23. In the embodiment, the coding control circuit 29 executes illustratively the algorithm of FIG. 4 for each block MBLK in order to control the re-quantization of the quantization circuit 23.

Figure 4:
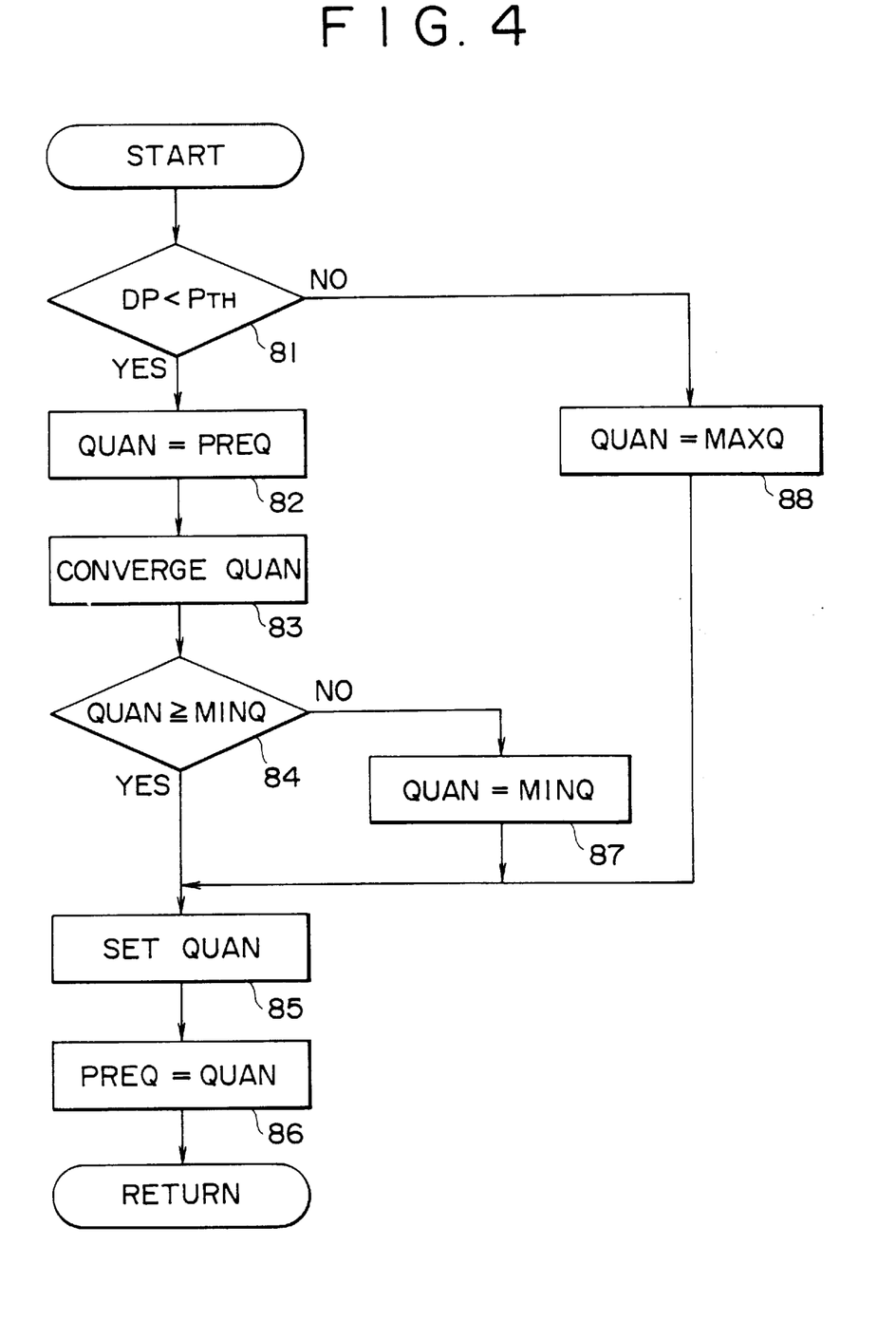
FIG. 4 is a view outlining a typical algorithm for use with the invention.

In step 81 of FIG. 4, the coding control circuit 29 compares the difference of power DP with a predetermined threshold value $P_{TH}$. If DP<$P_{TH}$, that means a high correlation (see relationship (2) above). Then the coding control circuit 29 goes from step 81 to step 82. In step 82, the quantization characteristic (i.e., step size) QUAN of the currently referenced block MBLK is made equal to the quantization characteristic PREQ of the same block MBLK in the preceding frame. In step 83, the value of the quantization characteristic QUAN is converged. For example, QUAN=QUAN+1 (i.e., characteristic QUAN is fragmented by one step), or QUAN=QUAN/2 (i.e., the step size is halved).

In step 84, the quantization characteristic QUAN is compared with a minimum quantization characteristic MINQ. If QUAN≧MINQ, step 84 is followed by step 85. In step 85, the quantization characteristic QUAN obtained in step 83 is set unchanged to the quantization circuit 23. In step 86, PREQ=QUAN in preparation for step 82 for the next frame period. Then the processing comes to an end.

If QUAN<MINQ in step 84, step 84 is followed by step 87. In step 87, the quantization characteristic QUAN is made equal to the minimum quantization characteristic MINQ. Step 87 is followed by step 85 in which the quantization characteristic QUAN is set to the quantization circuit 23.

As described, steps 82 through 87 set the quantization circuit 23 for the minimum quantization characteristic MINQ or for the quantization characteristic QUAN greater than MINQ where there exists a high correlation between a block MBLK in a given frame and the corresponding block MBLK in the preceding frame.

If DP≧$P_{TH}$ in step 81, that means there exists a low correlation (see relationship (1) above), In that case, step 81 is followed by step 88 in which the quantization characteristic QUAN is made equal to a maximum quantization characteristic MAXQ. Step 88 is followed by step 85 in which the quantization circuit 23 is set for the quantization characteristic QUAN.

Thus steps 88 and 85 set the quantization circuit 23 for the maximum quantization characteristic MAXQ where there exists a low correlation between a block MBLK in a given frame and the corresponding block MBLK in the preceding frame.

The processing above is repeated for each block MBLK. The quantization characteristic of the quantization circuit 23 is thus determined for each block MBLK.

Figure 3:
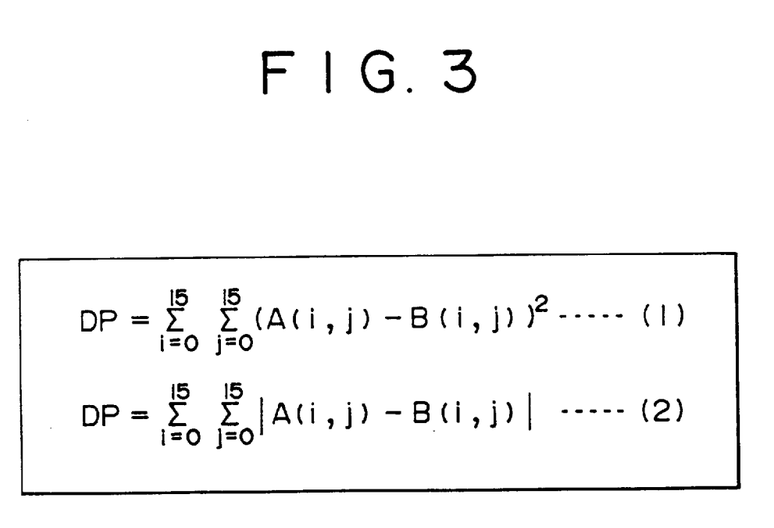
FIG. 3 is a view showing arithmetic expressions for use with the invention.

Although the difference of power DP is obtained using expression (1) of FIG. 3 with the above embodiment, expression (2) of the same figure may also be used alternatively for the same purpose.

As described and according to the invention, the intraframe-coded signal S24 representing the entire picture is transmitted periodically to the receiving side. This arrangement provides instantaneously a normally reproduced picture when an image data transmission is started, when any one of a plurality of images is selected and transmitted, or when a transmission line error has caused a reproduced image error.

In addition, the magnitude of the correlation between a block MBLK in a frame and the corresponding block MBLK in the preceding frame is obtained, and the quantization characteristic of the quantization circuit 23 is established according to that magnitude of the correlation. This allows the quantization circuit 23 to provide steady re-quantization even when the data quantity of the signal S24 left in the buffer memory 25 fluctuates.

Although a preferred embodiment of the invention has been described using specific terms, such description is for illustrative purposes only, and it is to be understood that changes and variations may be made without departing from the spirit or scope of the following claims.

What is claimed is:

1. Method of transmitting intraframe coded and interframe coded video signals, comprising the steps of:

receiving a video signal composed of frames of video data;

dividing each of said frames of video data into a plurality of blocks;

intraframe coding or interframe coding said plurality of blocks of each of said frames of video data to produce intraframe coded data or interframe coded data, respectively;

determining a correlation between one of said plurality of blocks of one of said frames of video data and a corresponding block of a preceding frame of video data by calculating a difference of power between said one block of said one frame of video data and said corresponding block of said preceding frame of video data;

setting a quantization width in accordance with said correlation;

quantizing said interframe coded data or said intraframe coded data to be transmitted in accordance with said quantization width to produce quantized interframe coded data or quantized intraframe coded data, respectively; and transmitting said quantized interframe coded data or periodically transmitting said quantized intraframe coded data.

2. The method of claim 1, further comprising the step of comparing said correlation with a predetermined value.

3. The method of claim 2, wherein said quantization width is set to a predetermined maximum quantization width when said correlation is equal to or greater than said predetermined value.

4. The method of claim 2, wherein said quantization width is set in accordance with a previous quantization width utilized to quantize said corresponding block of said preceding frame of video data when said correlation is less than said predetermined value.

5. The method of claim 4, wherein said quantization width is set to said previous quantization width converged in accordance with a predetermined function when said correlation is less than said predetermined value.

6. The method of claim 5, wherein said quantization width is set to a predetermined minimum quantization width when said previous quantization width converged in accordance with said predetermined function is less than said predetermined minimum quantization width.

7. The method of claim 6, wherein said quantization width is set to a predetermined maximum quantization width when said correlation is equal to or greater than said predetermined value.

8. The method of claim 2, wherein said quantization width is initially set to a previous quantization width utilized to quantize said corresponding block of said preceding frame of video data, and then said quantization width is increased if said correlation is equal to or greater than said predetermined value or said quantization width is decreased if said correlation is less than said predetermined value.

9. Apparatus for transmitting intraframe coded and interframe coded video signals, comprising:

means for receiving a video signal composed of frames of video data;

means for dividing each of said frames of video data into a plurality of blocks;

means for intraframe coding or interframe coding said plurality of blocks of each of said frames of video data to produce intraframe coded data or interframe coded data, respectively;

means for determining a correlation between one of said plurality of blocks of one of said frames of video data and a corresponding block of a preceding frame of video data, said means for determining including means for calculating a difference of power between said one block of said one frame of video data and said corresponding block of said preceding frame of video data;

means for setting a quantization width in accordance with said correlation;

means for quantizing said interframe coded data or said intraframe coded data to be transmitted in accordance with said quantization width to produce quantized interframe coded data or quantized intraframe coded data, respectively; and means for transmitting said quantized interframe coded data or periodically transmitting said quantized intraframe coded data.

10. The apparatus of claim 9, further comprising means for comparing said correlation with a predetermined value.

11. The apparatus of claim 10, wherein said means for setting said quantization width sets said quantization width to a predetermined maximum quantization width when said correlation is equal to or greater than said predetermined value.

12. The apparatus of claim 10, wherein said means for setting said quantization width sets said quantization width in accordance with a previous quantization width utilized to quantize said corresponding block of said preceding frame of video data when said correlation is less than said predetermined value.

13. The apparatus of claim 12, wherein said means for setting said quantization width sets said quantization width to said previous quantization width converged in accordance with a predetermined function when said correlation is less than said predetermined value.

14. The apparatus of claim 13, wherein said means for setting said quantization width sets said quantization width to a predetermined minimum quantization width when said previous quantization width converged in accordance with said predetermined function is less than said predetermined minimum quantization width.

15. The apparatus of claim 14, wherein said means for setting said quantization width sets said quantization width to a predetermined maximum quantization width when said correlation is equal to or greater than said predetermined value.

16. The apparatus of claim 10, wherein said means for setting said quantization width includes means for initially setting said quantization width to a previous quantization width utilized to quantize said corresponding block of said preceding frame of video data, and means for increasing said quantization width when said correlation is equal to or greater than said predetermined value and for decreasing said quantization width when said correlation is less than said predetermined value.

* * * * *